(No Model.)
S. SCHEUER.
FASTENER FOR TRAVELING BAGS, POCKET BOOKS AND OTHER ARTICLES.
No. 340,252. Patented Apr. 20, 1886.
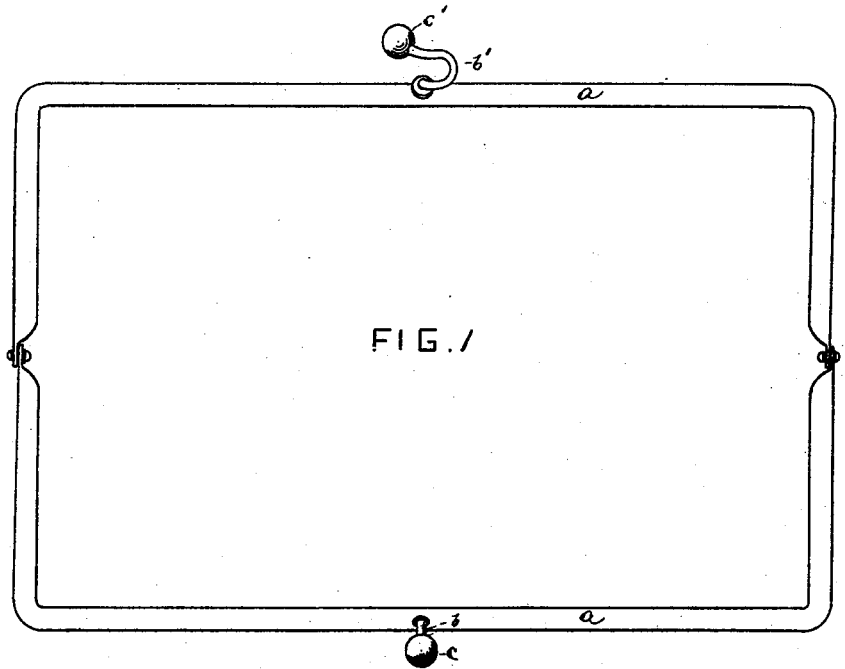
FIG. 1
FIG. 2
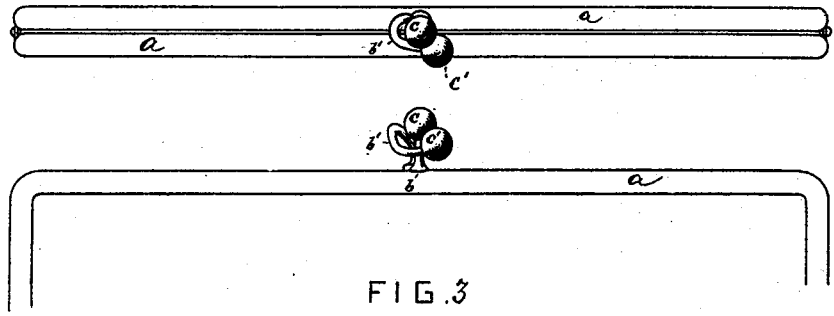
FIG. 3
WITNESSES
W<sup>m</sup> A. Lowe
Rob<sup>t</sup> H. Roy
INVENTOR
Simon Scheuer
by his attorneys
Roeder & Briesen

United States Patent Office.

SIMON SCHEUER, OF NEW YORK, N. Y.

FASTENER FOR TRAVELING-BAGS, POCKET-BOOKS AND OTHER ARTICLES.

SPECIFICATION forming part of Letters Patent No. 340,252, dated April 20, 1886.

Application filed March 3, 1886. Serial No. 193,879. (No model.)

*To all whom it may concern:*

Be it known that I, SIMON SCHEUER, of the city of New York, county and State of New York, have invented a new and Improved Fastener, of which the following specification is a full, clear, and exact description.

This invention relates to a fastener for traveling-bags, pocket-books, and similar articles.

It consists in the elements of construction hereinafter more fully pointed out.

In the accompanying drawings, Figure 1 represents the frame of a traveling-bag provided with my improved fastener, showing it open. Fig 2 is a top view of the same, showing it closed. Fig. 3 is a side view thereof.

The letters $a$ $a$ represent the jaws of a traveling-bag, pocket-book, or other article. One jaw carries a fixed catch consisting of a straight upright shank, $b$, and ball $c$. The other jaw carries a movable catch consisting of a curved shank $b'$ and ball $c'$. The shank $b'$ is swiveled to its jaw, so as to be free to be revolved around its point of attachment. The curve of the shank $b'$ is such as to form an open loop, which is highest at its center or closed portion and lowest at its two ends. (Fig. 3.)

In use the shank $b'$ is revolved until it embraces the shank $b$, while the ball $c'$ comes to rest against the side of the ball $c$. By the peculiar shape of the shank $b'$ the ball $c'$ is free to pass around the shank $b$, and not until such shank is embraced by the loop of shank $b'$ does the ball $c'$ move upwardly to friction against ball $c$. This catch is positive and will not open spontaneously, even if the parts are partly worn.

The shanks $b$ $b'$ may be made from wire or sheet metal.

I claim as my invention—

1. The combination of jaws $a$ with shank $b$, carrying ball $c$, and with swiveled loop-shaped shank $b'$, carrying ball $c'$, substantially as specified.

2. The combination of jaws $a$ with shank $b$, carrying ball $c$, and with swiveled loop-shaped shank $b'$, carrying ball $c'$, the shank $b'$ being curved so as to be higher at its center than at its ends, substantially as specified.

SIMON SCHEUER.

Witnesses:
A. QUITMAN,
F. V. BRIESEN.